US006858141B2

(12) United States Patent
Kulkarni et al.

(10) Patent No.: US 6,858,141 B2
(45) Date of Patent: Feb. 22, 2005

(54) PROCESS FOR THE PREPARATION OF ULTRAFILTRATION MEMBRANES OF POLYACRYLONITRILE, USING MALIC ACID AS AN ADDITIVE

(75) Inventors: Sudhir Sharadchandra Kulkarni, Pune (IN); Madhuri Himmatrao Shinde, Pune (IN); Deepak Anandrao Musale, Pune (IN)

(73) Assignee: Council of Scientific & Industrial Research (CSIR), New Delhi (IN)

( * ) Notice: Subject to any disclaimer, the term of this patent is extended or adjusted under 35 U.S.C. 154(b) by 0 days.

(21) Appl. No.: 10/232,098

(22) Filed: Aug. 30, 2002

(65) Prior Publication Data

US 2003/0102259 A1 Jun. 5, 2003

Related U.S. Application Data

(60) Provisional application No. 60/316,943, filed on Aug. 30, 2001.

(51) Int. Cl.[7] .............................................. B01D 39/14
(52) U.S. Cl. .............................. 210/500.43; 210/493.4; 210/500.27; 210/500.42; 264/41
(58) Field of Search ...................... 210/500.43, 500.27, 210/490, 654, 321.43, 493.4, 32.74, 500.42; 264/41

(56) References Cited

U.S. PATENT DOCUMENTS

| 3,615,024 | A | * | 10/1971 | Michaels | 210/490 |
| 3,616,024 | A | * | 10/1971 | Windle | 156/257 |
| 4,177,150 | A | * | 12/1979 | Inoue et al. | 210/500.43 |
| 4,251,605 | A | * | 2/1981 | Inoue et al. | 429/145 |
| 4,252,652 | A | * | 2/1981 | Elfert et al. | 210/654 |
| 4,323,627 | A | * | 4/1982 | Joh | 428/398 |
| 4,366,062 | A | * | 12/1982 | Kurihara et al. | 210/651 |
| 4,584,103 | A | * | 4/1986 | Linder et al. | 210/650 |
| 5,039,421 | A | * | 8/1991 | Linder et al. | 210/651 |
| 5,265,734 | A | * | 11/1993 | Linder et al. | 210/654 |
| 5,281,337 | A | * | 1/1994 | Chou et al. | 210/654 |

* cited by examiner

Primary Examiner—Ana Fortuna
(74) Attorney, Agent, or Firm—Schiff Hardin LLP

(57) ABSTRACT

The present Application relates to a process for the preparation of ultrafiltration membranes from polyacrylonitrile using malic acid as additives, with said membrane of molecular weight ranging between 80 to 180K, showing high purification and water permeating ability.

20 Claims, No Drawings

PROCESS FOR THE PREPARATION OF ULTRAFILTRATION MEMBRANES OF POLYACRYLONITRILE, USING MALIC ACID AS AN ADDITIVE

CROSS-REFERENCE TO RELATED APPLICATION

The present non-provisional application claims the benefit of Provisional Application Ser. No. 60/316,943 filed Aug. 30, 2001.

FIELD OF THE INVENTION

The present invention relates to a process for the preparation of ultrafiltration membranes based on polyacrylonitrile polymer based on acrylonitrile and other monomers. The membranes made by the process of this invention have much improved separation properties giving very high water permeating ability while retaining its good separation properties.

BACKGROUND AND PRIOR ART REFERENCES

Polymeric ultrafiltration membranes are commonly prepared by the phase inversion method (R. E. Kesting, 1971, Synthetic Polymeric Membranes, McGraw-Hill) in which a thin film of a polymer solution is solidified by immersion in a bath containing a nonsolvent. Poly(acrylonitrile) can be dissolved in polar organic solvents such as Dimethyl formamide (DMF), dimethyl acetaraide (DMAc), or dimethyl sulfoxide (DMSO) for purposes of membrane preparation (U.S. Pat. No. 4,025,439). By virtue of relatively low cost, solvent power and safety in handling, dimethyl formamide is a preferred solvent for preparing the polyacrylonitrile containing solution. For similar reasons, water is a preferred non-solvent.

The use of copolymers based on acrylonitrile with other monomers has been suggested as materials for ultrafiltration membranes e.g. U.S. Pat. No. 4,181,694 (isobutane, vinyledene chloride, butadiene, methacrylonitrile, ethylene vinyl ether as comonomers), U.S. Pat. No. 3,950,2579 vinyl pyrrolidone as comonomer) and U.K patent application GB 2,096,941 A (methyl metacrylate and sodium salt of vinylsulfonic acid as comonomers).

The prior art mentioned above does not describe the preparation of PAN (polyacrylonitrile) membranes using carboxylic acids. The Applicants (previous) Indian Patent (1811/DEL/96) has mentioned the preparation of membranes made of Polyacrylonitrile and its copolymers for purification of water. The objective of this invention remains the same, namely, aiming of a very high water permeating ability for better commercial usage of the membranes made thereof and keeping the separation properties the sane.

OBJECTS OF THE PRESENT INVENTION

The main object of the present invention is to develop a method of preparing an ultrafiltration membrane of polyacrylonitrile, using malic acid as an additive.

Another main object of the present invention is to develop a method of preparing an ultrafiltration membrane with high purification ability.

Yet another object of the present invention is to develop a method of preparing an ultrafiltration membrane with high water permeability ability.

Still another object of the present invention is to develop a method of preparing an ultrafiltration membrane of molecular weight ranging between 80–180K.

Still another object of the present invention is to develop a method of preparing an ultrafiltration membrane of

SUMMARY OF THE PRESENT INVENTION

The present Application relates to a process for the preparation of ultrafiltration membranes from polyacrylonitrile using malic acid as additives, with said membrane of molecular weight ranging between 80 to 180K, showing high purification and water permeating ability.

DETAILED DESCRIPTION OF THE PRESENT INVENTION

Accordingly, the present Application relates to a process for the preparation of ultrafiltration membranes from polyacrylonitrile using malic acid as additives, with said membrane of molecular weight ranging between 80 to 180K, showing high purification and water permeating ability.

In an embodiment of the present invention, wherein a process for the preparation of ultrafiltration membranes from polyacrylonitrile using malic acid as additives, with said membrane showing high purification and water permeating ability, said process comprising steps of:
1. preparing a saturated solution of the said additive in an organic solvent,
2. filtering the resulting solution to remove undissolved particles,
3. adding the poly(acrylonitrile) polymer optionally with its copolymer to the filtrate,
4. mixing thoroughly to obtain a homogenous solution,
5. casting the said homogenous solution on a moving porous backing,
6. gelling the cast film in a bath containing a non-solvent,
7. washing the cast membrane in water overnight,
8. obtaining the said ultrafiltration polymeric membrane, and
9. preparing spiral modules of the membrane, optionally.

In another embodiment of the present invention, wherein malic acid is in the concentration ranging between 0.5 to 9%.

In yet another embodiment of the present invention, wherein the polymer shows residual moisture content less than 0.5%.

In still another embodiment of the present invention, wherein the polymer shows molecular weight ranging between 80 to 180 K.

In still another embodiment of the present invention, wherein the spiral wound module performs better ultrafiltration as compared to plain membrane.

In still another embodiment of the present invention, wherein the dissolution time of the acid is ranging between 2 to 24 hours, preferably 8 hours.

In still another embodiment of the present invention, wherein organic solvent is selected from a group comprising dimethyl formamide (DMF), dimethyl acetamide, and dimethyl sulfoxide.

In still another embodiment of the present invention, wherein poly (acrylnitrile) polymer is in the concentration less than 30%.

In still another embodiment of the present invention, wherein poly (acrylnitrile) polymer is preferably in the concentration ranging between 10–20%.

In still another embodiment of the present invention, wherein non-solvent causes coagulation.

In still another embodiment of the present invention, wherein the non-solvent is miscible with both the salt and the solvent.

In still another embodiment of the present invention, wherein non-solvent is selected from a group comprising water, lower alcohols.

In still another embodiment of the present invention, wherein lower alcohols are selected from a group comprising methanol, and ethanol.

In still another embodiment of the present invention, wherein the temperature of non-solvent is ranging between 15° C. to 25° C.

In still another embodiment of the present invention, wherein the said process leads to the preparation of membrane with high rejection value as compared to the one without additive.

In still another embodiment of the present invention, wherein the said process leads to the preparation of membrane with Log Reduction (LR) value of about 9 or *E. Coli* as compared to the one without additive.

In still another embodiment of the present invention, wherein the said process leads to the preparation of membrane with bubble Point value ranging between 3.0 to 4.0 kg/cm$^2$.

In still another embodiment of the present invention, wherein water flux of the said membrane is significantly higher as compared to the one without additive.

In still another embodiment of the present invention, wherein ultrafiltration by the said membrane is better than the one without additive.

TABLE 1

| No | Additive | Water flux* Liters/m$^2$.hr | BSA' Rejection (%) | Bubble point (bars) Average | Range |
|---|---|---|---|---|---|
| 1 | None | 325 | 88 | 1.9 | 1.1–2.5 |
| 2 | Oxalic | 370 | 92 | 1.2 | 1.0–1.8 |
| 3 | Citric | 320 | 94 | 1.4 | 1.1–2.2 |
| 4 | Malic | 410 | 100 | 3.4 | 3.0–4.0 |
| 5 | Poly (acrylic) | 430 | 87 | 1.4 | 1.0–2.0 |

*measured at 0.5 kg/cm$^2$
Rejection of bovine serum albumin measured in stirred cell (Amicon) with 0.1% BSA buffer* solution at pH 7.5 and at 0.5 kg/cm$^2$
**Polymer concentration was 15%
Ref: NF 92/96 DATA (DEL/1811/96)

TABLE 2

| No | Additive | Water flux* Liters/m$^2$.hr | BSA$^+$ Rejection (%) | Bubble point (bars) Average | Range |
|---|---|---|---|---|---|
| 1 | None | 420 | 100 | 1.8 | 1.0–2.8 |
| 2 | Urea | 400 | 100 | 1.1 | 1.0–1.4 |
| 3 | LiCl | 140 | 100 | 2.1 | 1.6–3.0 |
| 4 | ZnCl$_2$ | 470 | 100 | 2.4 | 2.0–3.0 |
| 5 | AlCl$_3$ | 561 | 100 | 2.1 | 1.2–3.0 |
| 6 | ® FeCl$_3$ | 330 | 100 | 2.0 | |

*measured at 2.0 kg/cm
Rejection of bovine serum albumin measured in stirred cell (Amicon) with 0.1% BSA buffer solution at pH 7.5 and at 1.0 kg/cm$^2$ ˆ Only one sample tested
Polymer concentration was 13%

*E. Coli* log reduction for membranes prepared with malic acid as additive measurements done on coupon.

TABLE 3

| Code | Water flux* Liters/m$^2$.hr | % BSA Rejection | Bubble point Kg/cm2 | Feed counts. per.ml | Permeate counts, per.ml |
|---|---|---|---|---|---|
| 1 | 400 | 100 | 4 | 1.00E + 07 | nil |
|   |     |     |   | 1.00E + 09 | nil |
| 2 | 410 | 100 | 4 | 1.00E + 07 | nil |
|   |     |     |   | 1.00E + 09 | nil |
| 3 | 430 | 100 | >4 | 1.00E + 07 | nil |
|   |     |     |   | 1.00E + 09 | nil |

Measured with distilled water at 0.5 kg/cm2
Spiral wound module performance for bacteria removal

TABLE 4

| Spiral wound module | Water flux* (ml/min) | *E. coli* counts in permeate (per ml) | *E. coli* LR |
|---|---|---|---|
| PAN | 420–470 | 5000, 10000 | 4.0–4.3 |
| PAN-Z | 360–400 | 2, 7 | 7.1–7.7 |

*Measured with distilled water at 70 kPa

In still another embodiment of the present invention, wherein the present invention provides a process for the preparation of ultrafiltration membranes based on polyacrylonitrile, which comprises preparing a solution of acids in the range of 0.5–9% in an organic solvent filtering the resultant solution so as to remove the undissolved particles, adding polyacrylonitrile in an amount less than 30% by weight, to the above solution, mixing thoroughly to obtain a homogeneous solution, casting this solution by the conventional technique on a moving porous backing, and gelling the cast film in a bath containing the nonsolvent liquid for the polymer but miscible with both the acid and solvent to obtain the polymeric membrane.

In still another embodiment of the present invention, the solution used for the membrane contains between 0.5 to 9% of carboxylic acids, which are soluble, both in the solvent in which the polymer solution is made as also the nonsolvent chosen.

In still another embodiment of the present invention, wherein the polymers used include polyacrylonitrile or copolymers of acrylonitrile, prepared by any conventional method. The solvents used for preparing the solution of the polymers maybe selected from well-known solvents for polyacrylonitrile such as dimethyl formamide, dimethyl sulfoxide or dimethyl acetamide.

In still another embodiment of the present invention, wherein the non-solvent used to coagulate the polymer may be water or lower alcohols such as methanol, ethanol etc.

In still another embodiment of the present invention, wherein the acids, which are incorporated in the polymer solution, must be soluble both in the solvent as well as nonsolvent. They can be any with a carboxylic acid group, mono-bi functional carboxylic acids with suitable examples such acids like Malic, Oxalic, Citric and Poly (acrylic) acid, etc.

In still another embodiment of the present invention, wherein the carboxylic acids, mono-bi functional carboxylic acids, which are incorporated in the polymer solution, must have a minimum moisture level and the dissolution time of the acids must not be less than 2 hrs and not more than 24 hrs, preferably 8 hrs.

In still another embodiment of the present invention, wherein the polyacrylonitrile polymer should have a residual moisture content of less than 0.5%.

In still another embodiment of the present invention, wherein the polymer used should preferably be in the range of 80 to 180 k molecular weight.

The purification ability of the membrane can be expressed as follows:

R(Rejection)=1−(concentration of species A in the permeate/concentration of the species A in the feed)

Or.

LR(log reduction)=$\log_{10}$(concentration of species A in the feed/concentration of the species A in the Permeate)

It can also be expressed as

LR(log reduction)=$\log_{10}[1/(1-R)]$

In still another embodiment of the present invention, wherein ultrafiltration membranes are described by their nominal molecular weight cut off (MWCO) defined arbitrarily as the molecular weight of the species for which R is approximately 0.9 (Cheryan M., Ultrafiltration handbook, 1986, Technomic Publishing Co.)

In still another embodiment of the present invention, wherein the membranes prepared; as per the process of the present invention have very high values of water flux, which is the desired criterion for any process application in comparison to the said previous Indian patent. The presence of large pores/defects can be easily detected by the well-established bubble point technique. The membranes of this invention have much higher bubble points in comparison to the polyacrylonitrile membranes described earlier (Indian Patent (1811/DEL/96).

In still another embodiment of the present invention, wherein while the membranes of this invention have higher values of bubble point compared to the conventional membranes with a similar MWCO value, the membrane permeability for water has increased to certain extent.

The process of the present invention is described herein with examples, which are illustrative only and should not be construed to limit the scope of the present invention in any manner.

EXAMPLE 1

A solution was prepared by adding polyacrylonitrile in dimethyl formamide (DMF) in order to make a 15% polymer solution. The mixture was stirred until dissolution. It was then knife coated on a moving porous support and gelled at 20° C. in water. The cast membranes were washed in water overnight. The membranes were characterized for their pure water flux, rejection of BSA and their water bubble points. The performance of samples is summarized in Table 1.

EXAMPLE 2

A solution was prepared by first dissolving 2.5% of oxalic acid in DMF filtering the solution and then 15% polyacrylonitrile was added and stirred till complete dissolution. It was then cast by knife coating on a moving porous support and gelled at 20° C. in water. The cast membranes were washed in water overnight. The membranes were characterized for their pure water flux, rejection of BSA and their water bubble points. The performance of samples is also summarized in Table 1. Membranes cast from solutions containing an acid like oxalic acid gave membranes with slight increase in flux not much affecting the bubble point.

EXAMPLE 3

A solution was prepared by first dissolving 5.5% of Citric acid in DMF filtering the solution and then 15% polyacrylonitrile was added and stirred till complete dissolution. It was then cast by knife coating on a moving porous support and gelled in 20° C. water. The cast membranes were washed in water overnight. The membranes were characterized for their pure water flux, rejection of BSA and their water bubble points. The performance of samples is also summarized in Table 1. Membranes cast from solutions containing Citric acid have no much effect on the water permeation properties but the bubble point remains unaltered.

EXAMPLE 4

A solution was prepared by first dissolving 3.5% of Malic acid in DMF, filtering the solution and then 15% polyacrylonitrile was added and stirred till complete dissolution. It was then cast by knife coating on a moving porous support and gelled at 20° C. in water. The cast membranes were washed in water overnight. The membranes were characterized for their pure water flux, rejection of BSA and their water bubble points. The performance of these membrane samples is summarized in Table 1. Membranes cast from solutions containing Malic acid show much improved properties in comparison to membranes without any additive. There is a noticeable increase in the flux also keeping the bubble point to the higher side. In this case BSA retention is also very good.

EXAMPLE 5

A solution was prepared by first dissolving 2.2% of Poly(acrylic) acid in DMF, filtering the solution and then 15% polyacrylonitrile was added and stirred till complete dissolution. It was then cast by knife coating on a moving porous support and gelled at 20° C. in water. The cast membranes were washed in water overnight. The membranes were characterized for their pure water flux, rejection of BSA and their water bubble points. The performance of these membrane samples is summarized in Table 1. Membranes cast from solutions containing Poly (acrylic) acid show similar water permeating ability in comparison to the membrane with Malic acid but there is a lot of variance in the bubble point.

EXAMPLE 6

The membrane prepared using Malic acid showing the best performance was tested for its *E. Coli* retention properties. The data was analysed on coupon scale at a pressure of 0.5 kg/cm$^2$ with a constant speed of stirring at 600 rpm. The feed solution contained an *E. Coli* count of $10^7$ and $10^9$ counts per ml. The permeate was collected and assayed for bacterial count along with the feed samples. The results are tabulated in Table 3. These membranes showed 9 log reduction for *E. Coli* with improved separation properties in comparison to the said previous Indian Patent (1811/DEL/96). (Table 2)

What is claimed is:

1. A process for the preparation of an ultrafiltration polymeric membrane from polyacrylonitrile using malic acid as an additive, said process comprising the steps of:
   (a) preparing a saturated solution of said additive in an organic solvent,
   (b) filtering the saturated solution to remove undissolved particles,
   (c) adding polyacrylonitrile or acrylonitrile polymer to the filtrate,
   (d) mixing thoroughly to obtain a homogeneous solution, (e) casting the homogeneous solution on a porous backing to form a cast film, (f) gelling the cast film in a bath containing a non-solvent to form a cast membrane, (g) washing the cast membrane in water, and (h) obtaining the ultrafiltration polymeric membrane.

2. The process of claim 1, wherein said malic acid is in a concentration between 0.5% to 9%.

3. The process of claim 1, wherein the ultrafiltration polymeric membrane has a residual moisture content less than 0.5%.

4. The process of in claim 1, wherein the ultrafiltration polymeric membrane has a molecular weight between 8 K to 180 K.

5. The process of claim 1, wherein the dissolution time of the acid is between 2 hours to 24 hours.

6. The process of claim 1, wherein the organic solvent is selected from a group comprising dimethyl formamide (DMF), dimethyl acetamide, and dimethyl sulfoxide.

7. The process of claim 1, wherein the polyacrylonitrile or acrylonitrile polymer is in a concentration less than 30%.

8. The process of claim 1, wherein the polyacrylonitrile or acrylonitrile polymer is in a concentration between 10% to 20%.

9. The process of claim 1, wherein the non-solvent causes coagulation.

10. The process of claim 1, wherein the non-solvent is miscible with both a salt and the solvent.

11. The process of claim 1, wherein the non-solvent is selected from a group comprising water and lower alcohols.

12. The process of claim 11, wherein the lower alcohols are selected from a group comprising methanol and ethanol.

13. The process of claim 1, wherein the temperature of the non-solvent is between 15° C. to 25 ° C.

14. The process of claim 1, wherein said ultrafiltration polymeric membrane has a high rejection value compared to an ultrafiltration polymeric membrane without said additive.

15. The process of claim 1, wherein said ultrafiltration polymeric membrane has a Log Reduction (LR) value of about 9 or *E. Coli* compared to an ultrafiltration polymeric membrane without said additive.

16. The process of claim 1, wherein said ultrafiltration polymeric membrane has a bubble point value between 3.0 $kg/cm^2$ to 4.0 $kg/cm^2$.

17. The process of claim 1, wherein the dissolution time of the acid is about 8 hours.

18. The process of claim 1, wherein a copolymer of the polyacrylonitrile or acrylonitrile polymer is added with the polyacrylonitrile or acrylonitrile polymer to the filtrate.

19. The process of claim 1, wherein said ultrafiltration polymeric membrane is prepared into spiral modules.

20. A process for the preparation of an ultrafiltration polymeric membrane from polyacrylonitrile using malic acid as an additive, said process comprising the steps of:

(a) preparing a saturated solution of said additive in an organic solvent, (b) filtering the saturated solution to remove undissolved particles, (c) adding polyacrylonitrile polymer or acrylonitrile polymer to filtrate, (d) mixing the polymer and the filtrate thoroughly to obtain a homogeneous solution, (e) casting the homogeneous solution on a porous backing to form a cast film, (f) gelling the cast film in a bath containing a non-solvent to form a cast membrane, (g) washing the cast membrane in water, and (h) obtaining the ultrafiltration polymeric membrane, wherein said membrane has a molecular weight between 80 K to 180 K and said ultrafiltration polymeric membrane has a bubble point value between 3.0 $kg/cm^2$ to 4.0 $kg/cm^2$.

* * * * *